(No Model.)

E. T. GREGG.
CULTIVATOR.

No. 274,590. Patented Mar. 27, 1883.

WITNESSES:
Chas. T. Howell,
C. Sedgwick

INVENTOR:
E. T. Gregg
BY Munn & Co.
ATTORNEYS.

UNITED STATES PATENT OFFICE.

ELLIOT T. GREGG, OF MARSHALL, MICHIGAN.

CULTIVATOR.

SPECIFICATION forming part of Letters Patent No. 274,590, dated March 27, 1883.

Application filed September 13, 1882. (No model.)

*To all whom it may concern:*

Be it known that I, ELLIOT T. GREGG, of Marshall, in the county of Calhoun and State of Michigan, have invented a new and Improved Cultivator, of which the following is a full, clear, and exact description.

This invention relates to improvements in cultivators, mainly designed for use in garden-farming to remove weeds and pulverize the surface of the ground already sown with seeds which come up slowly and are preceded by the weeds; and it consists in the combination and arrangement of parts, substantially as hereinafter more fully set forth and claimed.

Reference is to be had to the accompanying drawings, forming part of this specification, in which similar letters of reference indicate corresponding parts in both the figures.

Figure 1:
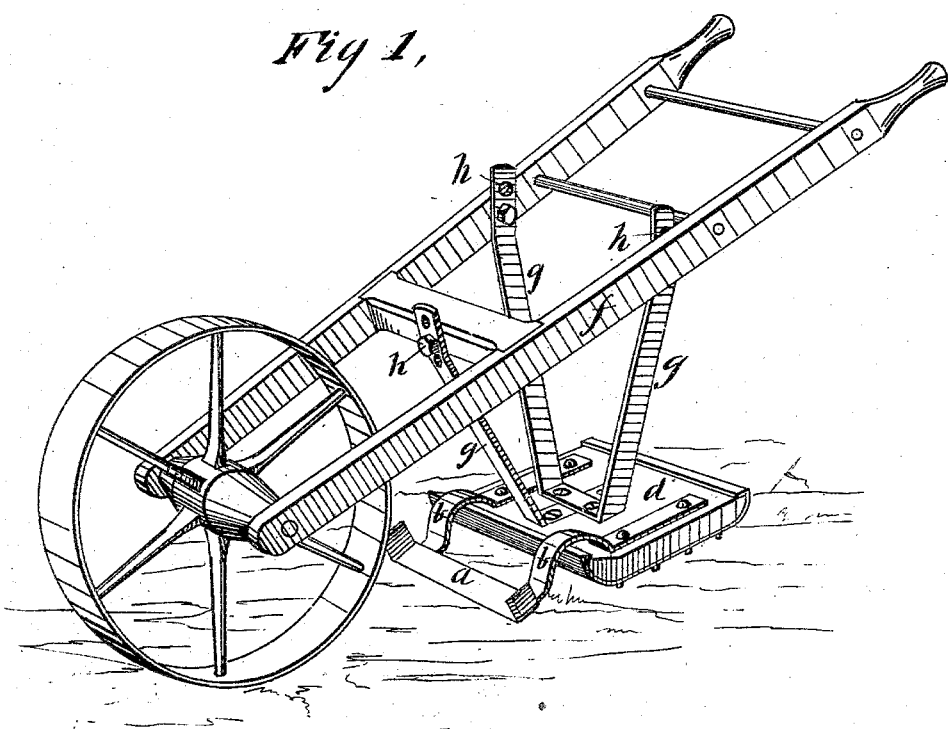
Figure 2:
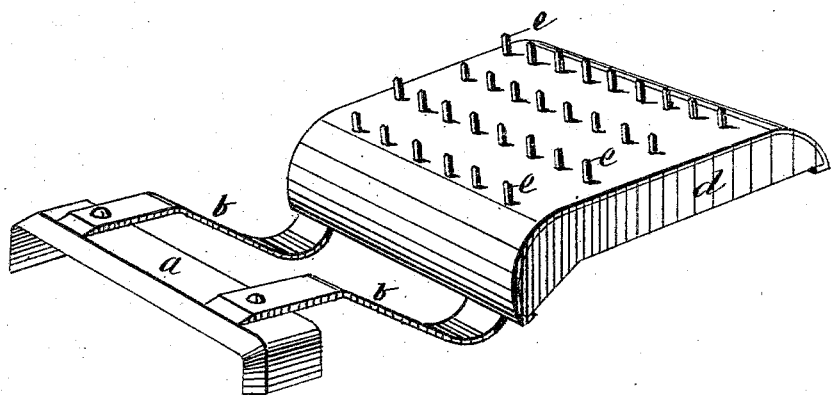

Figure 1 is a perspective view of a cultivator of my invention applied to a wheeled truck. Fig. 2 is a perspective view of the cutter and rubber or pulverizer inverted.

*a* represents a straight-edged blade of steel, attached by arms or brackets *b* to the back of a rubber or scraper, *d*, and set at a suitable angle to be made to cut a thin skin of earth by drawing or pushing the rubber *d* along the surface of the ground, so as to cut off the fresh weeds springing up from ground previously sowed with seeds which come up slowly. The rubber *d* is provided with short teeth *e* on the under side, to scratch and pulverize the ground to a slight depth to lighten the soil for favoring the rise of the sprouts, said teeth being sufficiently short to avoid disturbing the roots. These devices are in this case suspended from the handle-beams *f* of a hand-truck by arms or brackets *g*, to be suitably adapted to the work, said arms being adjustably connected to the beams at *h* to alter the pitch or set of the rubber or knife, as desired, which alters the depth to which the knife cuts.

The machine is very efficient for such purposes, as will be readily understood by those skilled in the art of gardening.

The blade *a* may be straight, or may be turned up at each end, as shown.

Having thus fully described my invention, I claim as new and desire to secure by Letters Patent—

1. In a hand-cultivator, the rubber or pulverizer *d*, having a series of teeth, combined with the knife or cutter *a*, connected by curved arms or brackets *b* to the rubber or pulverizer, to adapt the knife to cut slightly below the surface, and the rubber, with its teeth, to pulverize the loosened earth, substantially as and for the purpose set forth.

2. The combination of the pulverizer *d*, having teeth, the knife or cutter *a*, having turned-up sharpened ends, and connected to the rubber or pulverizer *d* by the curved arms *b*, the standards or uprights *g*, and hand-truck *f*, substantially as and for the purpose set forth.

ELLIOT T. GREGG.

Witnesses:
   THOS. W. WELLS,
   THOS. C. BARNES.